(12) United States Patent
Edelstein (10) Patent No.: US 7,233,142 B1
(45) Date of Patent: Jun. 19, 2007

(54) PLANER READER OF NON-ERASABLE MAGNETIC MEDIA AND LOCAL PERMEABILITY

(75) Inventor: Alan S. Edelstein, Alexandria, VA (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 241 days.

(21) Appl. No.: 10/932,058

(22) Filed: Sep. 2, 2004

(51) Int. Cl.
*G01N 27/72* (2006.01)
*G01R 33/12* (2006.01)

(52) U.S. Cl. ...................................................... 324/235
(58) Field of Classification Search ........ 324/210–212, 324/234–240, 207.2–207.26; 360/25, 31, 360/53, 66, 321
See application file for complete search history.

(56) References Cited

U.S. PATENT DOCUMENTS

| | | | |
|---|---|---|---|
| 4,297,636 A * | 10/1981 | Link et al. ................... | 324/262 |
| 4,816,761 A * | 3/1989 | Josephs ....................... | 324/212 |
| 4,954,920 A * | 9/1990 | Yamada et al. ............. | 360/315 |
| 5,408,377 A | 4/1995 | Gurney et al. | |
| 5,764,567 A | 6/1998 | Parkin | |
| 5,870,260 A * | 2/1999 | Davies et al. ............... | 360/313 |
| 6,072,382 A | 6/2000 | Daughton et al. | |
| 6,124,711 A | 9/2000 | Tanaka et al. | |
| 6,183,889 B1 * | 2/2001 | Koshiba et al. ............. | 428/812 |
| 6,330,136 B1 | 12/2001 | Wang et al. | |
| 6,349,053 B1 | 2/2002 | Daughton et al. | |
| 6,381,171 B1 | 4/2002 | Inomata et al. | |
| 6,418,048 B1 | 7/2002 | Sin et al. | |
| 6,462,641 B1 | 10/2002 | Dieny et al. | |

(Continued)

OTHER PUBLICATIONS

Mason, A. et al., "A Low-Power Wireless Microinstrumentation System for Environmental Monitoring," Transducers '95/Eurosensors IX, 8th Int. Conf. On Solid-State Sensors and Actuators, and Eurosensors IX, Stockholm, Sweden, pp. 107-110 (1995).

Lisby, T. et al., "Fabrication and Characterization of Flexible Silicon Substrates with Electroplated Leads," Proc. of the IEEE Sensors Conference, Orlando, Florida (2002).

(Continued)

*Primary Examiner*—Edward Lefkowitz
*Assistant Examiner*—Kenneth J. Whittington
(74) *Attorney, Agent, or Firm*—Edward L. Stolarun (57) ABSTRACT

A planer reader and method of probing the magnetic permeability of a material using a magnetic flux circuit comprises a substrate; a near-circular soft magnetic layer adjacent to the substrate; a gap configured in the soft magnetic layer, wherein the gap creates an opening between two ends of the soft magnetic layer, and wherein the gap is configured to align with a material located a distance from the soft magnetic layer; a magnetic flux generator adapted to provide magnetic flux to the material; and a magnetic sensor adapted to measure the magnetic flux traversing the material. The circuit further comprises an insulator covering the soft magnetic layer, the gap, the magnetic flux generator, and the magnetic sensor. The magnetic flux generator comprises a magnet or a magnetic coil proximate to the soft magnetic layer. Moreover, the soft magnetic layer comprises a soft ferromagnet. In one embodiment, the substrate is flexible.

19 Claims, 5 Drawing Sheets

U.S. PATENT DOCUMENTS

| | | |
|---|---|---|
| 6,545,469 B1 * | 4/2003 | Batzinger et al. ........... 324/238 |
| 6,727,105 B1 | 4/2004 | Brug et al. |
| 6,751,060 B2 | 6/2004 | Lundstrom |
| 6,762,954 B1 | 7/2004 | Edelstein |
| 2002/0008948 A1 | 1/2002 | Sasaki et al. |
| 2002/0047145 A1 | 4/2002 | Nickel |

OTHER PUBLICATIONS

Parkin, S. et al., "Magnetically Engineered Spintronic Sensors and Memory," Proc. of the IEEE, vol. 91, No. 5, pp. 661-680 (2003).

Jansen, R., "The Spin-Valve Transistor: A Review and Outlook," J. Phys. D: Appl. Phys. 36, R289-R308 (2003).

* cited by examiner

PLANER READER OF NON-ERASABLE MAGNETIC MEDIA AND LOCAL PERMEABILITY

GOVERNMENT INTEREST

The embodiments of the invention described herein may be manufactured, used, and/or licensed by or for the United States Government.

BACKGROUND OF THE INVENTION

1. Field of the Invention

The embodiments of the invention generally related to reading the magnetic permeability of a material on or near a surface such as the reading or nondestructive testing of magnetic storage devices, and more particularly to devices and techniques used for probing the local magnetic permeability of magnetic materials.

2. Description of the Related Art

In the constantly evolving magnetic recording industry, information is generally stored as magnetic bits on thin ferromagnetic films. Generally, magnetic bits of information are stored in the direction of the magnetization in small, local regions of magnetic media (i.e., magnetic films). Magnetic films are typically used in a variety of devices that include magnetic random access memories (MRAM) and magnetic recording media. However, defects or magnetization reversals in these films can cause failure and potentially lead to serious accidents depending on the particular application implementing the ferromagnetic films.

Conventionally, in reading the magnetic bits of information, detection devices are used to measure the direction and amplitude of the magnetization of small regions along a magnetic track. Computer storage devices, such as magnetic disk drives utilize read/write heads to store and retrieve data. A write head stores data by utilizing magnetic flux to set the direction and amplitude of the magnetic moment of a particular area on a magnetic medium. The state of the magnetic moment is later read by a read head, which senses the magnetic fields.

Conventionally, read heads utilize giant magnetoresistance (GMR) read heads, which are spin valve transistors or other devices similar to spin valves. These GMR thin-film read heads employ a magnetoresistive structure, generally formed in a layered structure of ferromagnetic and non-ferromagnetic metals, to detect the magnetic moments of the data bits on the media. A sensing current is passed through the magnetoresistive material to detect changes in the resistance of the material induced by the data bits as they pass the read head. Spin valve transistors can be formed in different arrangements, but are usually configured as four-layer structures including a hard or pinned ferromagnetic layer, a layer that performs the pinning, a soft ferromagnetic layer, and a thin intervening conductor layer. The layer that performs the pinning is typically an antiferromagnet.

However, this stored magnetic information in the media can be destroyed (i.e., altered or deleted) by applying a large magnetic field that will modify the direction of the magnetization on the magnetic media. Because of this, there is a need for a more permanent technique of storing magnetic information in magnetic media. Moreover, there is a need for improved methods with heightened sensitivity for finding defects and micron size imperfections in the surfaces of materials.

Nondestructive testing of components during manufacture or in use is important to avoid malfunctions that can lead to lost time or injury. Many parts of magnetic storage devices are either ferromagnetic or contain designed or damaged openings on their surface that can be infiltrated with ferromagnetic particles. Thus, magnetic sensors can be used for nondestructive testing. Unfortunately, most conventional testing methods measure the magnetization and/or do not measure on a micron-size scale. For example, while magnetic atomic force microscopes (MAFMs) measure on a micron-size scale, they tend to measure the magnetic field rather than the magnetic permeability. Furthermore, MAFMs tend to be complicated, expensive devices that are very sensitive to vibrations. Measuring the magnetic permeability provides an additional method for nondestructive testing. For example, two components might have the same magnetization but very different magnetic permeability if one of them has been strained or work hardened. Thus, there is a need to measure the magnetic permeability of materials on a micron-size scale.

SUMMARY OF THE INVENTION

In view of the foregoing, an embodiment of the invention provides a magnetic flux circuit comprising a substrate; a soft magnetic layer adjacent to the substrate; a gap configured in the soft magnetic layer, wherein the gap creates an opening between two ends of the soft magnetic layer, and wherein the gap is configured to align with a material located a distance from the soft magnetic layer; a magnetic flux generator adapted to provide magnetic flux to the material; and a magnetic sensor adapted to measure the magnetic flux traversing the material. The circuit further comprises an insulator covering the soft magnetic layer, the gap, the magnetic flux generator, and the magnetic sensor. The magnetic flux generator comprises either a magnet or a magnetic coil proximate to the soft magnetic layer. Moreover, the soft magnetic layer comprises permalloy or some other soft ferromagnetic material. In one embodiment, the substrate is flexible. Additionally, the circuit further comprises a modulating device attached to the insulator, the modulating device being configured for modulating the magnetic flux. Furthermore, according to another aspect of the invention, the substrate comprises a hole aligned with the gap in the soft magnetic layer, wherein the hole is configured to align with the material.

Another embodiment of the invention provides a planer reader for probing the magnetic permeability of a material located a distance from the planer reader, wherein the planer reader comprises a substrate; a soft magnetic layer adjacent to the substrate; a gap configured in the soft magnetic layer, wherein the gap is configured to align with a material located a distance from the soft magnetic layer; a magnetic flux generator adapted to provide magnetic flux to the material; and a magnetic sensor adapted to measure the magnetic flux that traverses the material, wherein the soft magnetic layer, the magnetic flux generator, and the magnetic sensor are co-planer. The planer reader further comprises an insulator covering the soft magnetic layer, the gap, the magnetic flux generator, and the magnetic sensor. According to a first embodiment, the magnetic flux generator comprises a magnet. According to a second embodiment, the magnetic flux generator comprises a magnetic coil near or surrounding the soft magnetic layer. Moreover, the soft magnetic layer comprises permalloy or some other soft ferromagnetic material. Additionally, the soft magnetic layer comprises a near-circular configuration having a first a first end and a second end, and wherein the gap creates an opening between the first and second ends of the soft magnetic layer. The planer reader further comprises a modulating device connected to the insulator, the modulating device configured for modulating the magnetic flux. According to an aspect of the invention, the substrate comprises a hole aligned with the gap in the soft magnetic layer, wherein the hole is configured to align with the material.

Still another aspect of the invention provides a method of manufacturing a magnetic flux circuit wherein the method comprises forming a soft magnetic layer adjacent to a substrate by configuring the soft magnetic layer in a near-circular configuration; configuring a gap in the soft magnetic layer, wherein the gap is configured to align with a material located a distance from the soft magnetic layer; positioning a magnetic flux generator adjacent to the soft magnetic layer; arranging a magnetic sensor adjacent to the soft magnetic layer; and depositing an insulator over the soft magnetic layer, the gap, the magnetic flux generator, and the magnetic sensor, wherein the magnetic flux generator is adapted to provide magnetic flux to the material, wherein the magnetic sensor is adapted to measure a magnetic permeability of the material by measuring a change in the magnetic flux when the material is aligned with the gap, and wherein the soft magnetic layer, the magnetic flux generator, and the magnetic sensor are arranged in a co-planer configuration. According to a first embodiment of the invention, in the step of positioning, the magnetic flux generator comprises a magnet. According to a second embodiment of the invention, in the step of positioning, the magnetic flux generator comprises a magnetic coil proximate to the soft magnetic layer. In the step of forming, the soft magnetic layer comprises permalloy or some other soft ferromagnet. Additionally, the step of configuration the gap creates an opening between two ends of the soft magnetic layer. The method further comprises connecting a modulating device to the insulator, forming a hole in the substrate, aligning the hole with the gap in the soft magnetic layer, and aligning the hole with the material, wherein the modulating device is configured for modulating the magnetic flux.

Another aspect of the invention provides a method of probing the magnetic permeability of a material, wherein the method comprises aligning a planer reader with a material located a distance from the reader, wherein the planer reader comprises: a soft magnetic layer configured in a near-circular configuration adjacent to a substrate; and insulator covering the soft magnetic layer; and a gap configured in the soft magnetic layer and aligned with the material. The method further comprises applying a magnetic flux to the material and measuring the magnetic permeability of the material. The step of applying is performed by a magnetic flux generator comprising a magnet. In another embodiment, the step of applying is performed by a magnetic flux generator comprising a magnetic coil near or surrounding the soft magnetic layer. In the step of aligning, the soft magnetic layer comprises permalloy or another soft ferromagnet. Additionally, the gap creates an opening between two ends of the soft magnetic layer. The method further comprises modulating the reluctance of a path of the magnetic flux.

The fabrication of the embodiments of the invention offer a low cost approach in producing a highly sensitive planer reader for detecting micron size imperfections in the surface of a magnetic media such as a ferromagnetic material. The method offers the advantage of a low cost method for quickly detecting changes in the magnetic permeability on a micron size scale.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for improved methods with heightened sensitivity for finding defects and micron size imperfections in the surfaces of ferromagnetic materials, as well as for a more permanent technique of storing magnetic information in magnetic media, and for improved techniques for probing the magnetic properties of materials and measuring the magnetic permeability of materials on a micron-size scale. The embodiments of the invention achieve this by providing a more permanent technique for storing the magnetic information by utilizing regions in the magnetic media with different magnetic permeability, and which reads these regions having a higher or lower magnetic permeability. As such the embodiments of the invention provide a planer reader that can probe the local magnetic permeability of surfaces of magnetic material previously deposited on planar or non-planar surfaces. Referring now to the drawings, and more particularly to FIGS. 1(A) through 5(C), there are shown preferred embodiments of the invention.

Figure 1A:
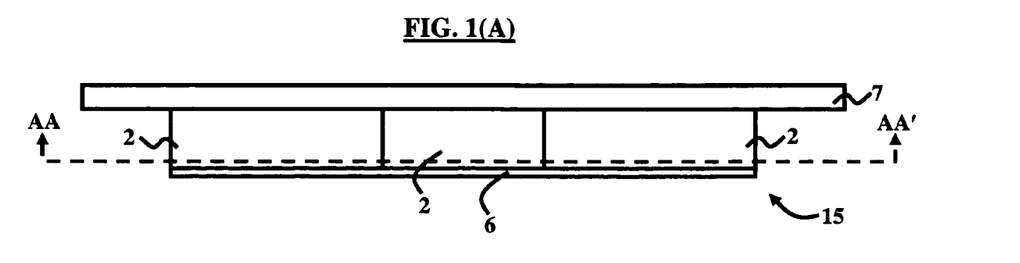
FIG. 1(A) is a side view of a planar reader device according to a first embodiment of the invention.
Figure 1B:
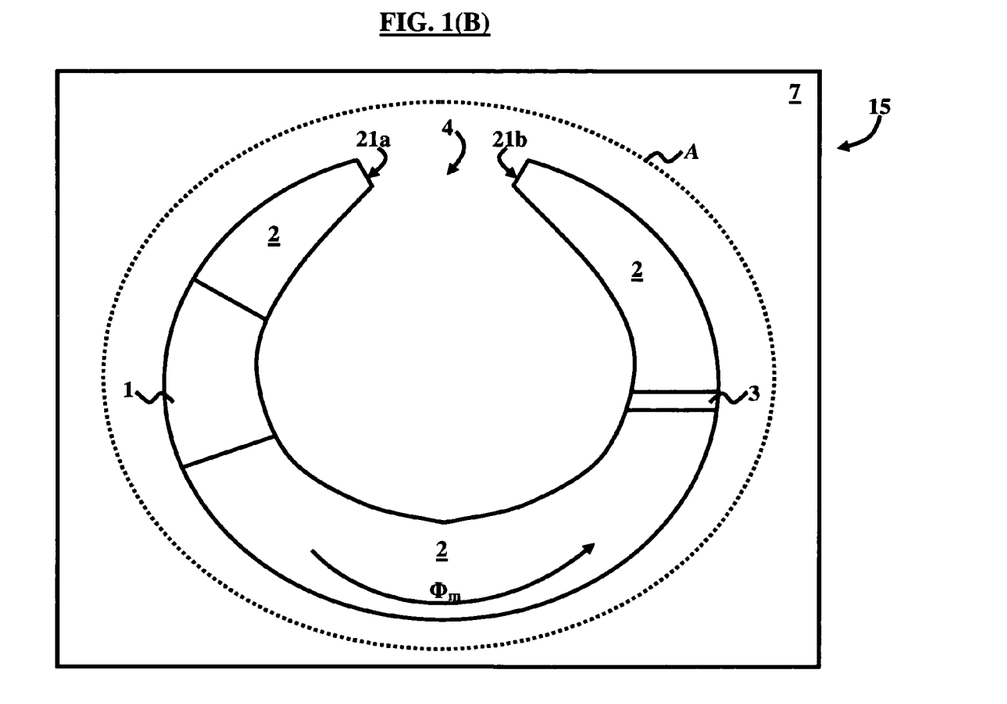
FIG. 1(B) is a top view cut along line AA–AA' of the planer reader device of FIG. 1(A) according to a first embodiment of the invention.

FIGS. 1(A) and 1(B) illustrate a first embodiment of an enhanced planar reader 15 used for probing local magnetic permeability in a material 5 such as a magnetic media. Generally, the planar reader 15 includes a magnetic flux circuit A with a gap 4 configured therein. As illustrated in FIGS. 1(A) and 1(B), the planer reader 15 comprises a soft magnetic layer 2 preferably comprising a soft ferromagnetic material such as permalloy, a source of magnetic flux (i.e., a magnetic flux generator 1) such as a permanent magnet (for example, a hard ferromagnet) or a coil sandwiched between portions of the soft magnetic layer 2, and a magnetic sensor 3 also sandwiched between portions of the soft magnetic layer 2, wherein the magnetic flux generator 1 is generally positioned diameterically opposed to the magnetic sensor 3, and wherein the magnetic flux generator 1, soft magnetic layer 2, and magnetic sensor 3 are deposited on a substrate 7. The substrate 7 may comprise silicon, glass, quartz, or other materials known in the art, and as further described below, the substrate 7 may be deformable. It is desirable that the geometry of the flux circuitry should be simple, nearly planer and not have any sharp corners. Making it planer makes it simple to fabricate. Making it simple and without sharp corners makes it easier to control the magnetic flux lines. Examples of simple geometries for the flux circuit include approximately circular or elliptical configurations.

By configuring the magnetic flux generator 1 as a coil, the magnetic flux lines of the magnetic field could be modulated. By modulating the magnetic field, the magnetic field to be detected becomes an AC field. Here, the AC field comprises a field that is changed in an approximately sinusoidal fashion. The benefits of this modulation include: First, one can use narrow band detection techniques to detect the signal; i.e., one can choose a detector that only detects signals in a narrow band around the modulation frequency. Second, most sensors have 1/f noise that decreases their performance at low frequencies. Modulating the field shifts the operating frequency to higher frequencies where the 1/f noise is lower and, hence, the sensing performance is expected to be better.

Additionally, to facilitate fabrication of the planer reader 15, the magnetic flux generator 1, soft magnetic layer 2, and magnetic sensor 3 lie in the same plane. The planer reader 15 is generally configured such that a gap 4 separates two ends 21a, 21b of the soft magnetic layer 2 from one another. The distance, d, over which the planer reader 15 can determine the local magnetic permeability of the material 5 depends on the size of the gap 4. If the gap 4 is relatively small, then the planer reader 15 is sensitive to changes in the local magnetic permeability of the material 5 brought near the gap 4 on a fine scale near the surface. If one desires to investigate the magnetic permeability further below the surface, one must use a larger gap 4. The size scale of the planer reader 15 can be varied to permit different applications.

If the scale of the elements of the planer reader 15 is approximately one micron, then the different components of the planer reader 15 can be fabricated by standard deposition techniques involving optical lithography and sputtering or evaporation. Different mask and sources are used for the different elements; i.e., the magnetic flux generator 1, soft magnetic layer 2, and magnetic sensor 3. At least one of these components, the magnetic sensor 3, utilizes multiple depositions. For example, if the magnetic sensor 3 is a spin valve transistor, then four or more layers are deposited including a hard or pinned ferromagnetic layer, a layer that performs the pinning, a soft ferromagnetic layer, and a thin intervening conductor layer. The soft magnetic layer 2 can be deposited from a single source, for example, by sputtering from a permalloy (80% Ni, 20% Fe) target. Similarly, the magnetic flux generator 1 can be deposited by sputtering from a target of permanent magnet such as NdFeB or SmCo. If the scale of the elements is mm size, then shadow masks can be used in their fabrication. Electron lithography or other techniques may be used if the scale of the elements is less than approximately one micron.

During operation of the planer reader 15, the magnetic flux generator 1 provides the magnetic flux, $\Phi_m$. The soft magnetic layer 2 forms a part of the magnetic flux circuit A by providing a low impedance path for the flux lines. The magnetic sensor 3 measures the number of flux lines passing through that portion of the magnetic flux circuit A. The magnetic sensor 3 can be embodied as a spin valve, but other sensors such as anisotropic magnetoresistive (AMR) sensors or spin tunneling sensors can also be used to measure the magnetic flux lines. Many descriptions of spin valves exist in the literature, such as those described in Parkin, S. et al., "Magnetically Engineered Spintronic Sensors and Memory," Proc. IEEE, Vol. 91, No. 5, pp. 661–680 (2003), the complete disclosure of which, in its entirety, is herein incorporated by reference, and the embodiments of the invention are not limited to incorporation of any particular type of sensor or spin valve. Furthermore, the sense direction of the magnetic sensor 3 is perpendicular to the lengthwise dimensions of the magnetic sensor 3.

The number of flux lines passing through the magnetic sensor 3 depends on the magnetic permeability of the material 5 that is formed on a surface of a supporting material 8 that is brought near the gap 4 in the magnetic flux circuit A shown in FIG. 1(B). The number of flux lines passing through the magnetic sensor 3 will increase if a highly permeable magnetic material 5 is brought near the gap 4. Preferably, the surface of the planer reader 15 is protected by a thick layer (approximately 100 nm thick) of insulating material 6 such as aluminum oxide, shown in FIG. 1(A). In one application, the planer reader 15 can be used to scan a supporting material 8 containing information in the form of regions of high and lower magnetic permeability (generally illustrated as material 5). Additionally, the planer reader 15 is preferably capable of measuring the local magnetic properties on a scale of approximately 0.1 to 10 microns in their smallest dimensions, but as discussed above the resolution can be lowered by increasing the gap size to increase the depth resolution.

Figure 2A:
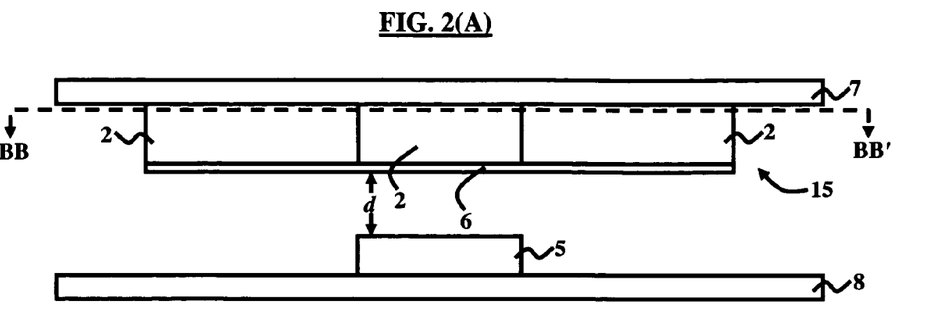
FIG. 2(A) is a side view of a planer reader apparatus according to an embodiment of the invention.
Figure 2B:
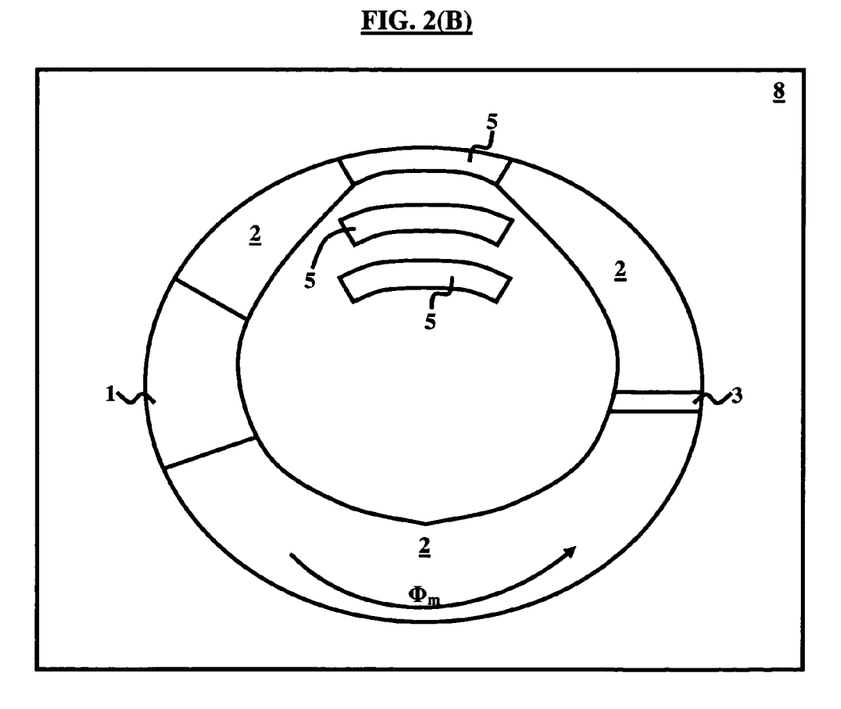
FIG. 2(B) is a top view cut along line BB–BB' of the planer reader apparatus of FIG. 2(A) according to an embodiment of the invention.

An apparatus illustrating the planer reader 15 probing a material 5 that is deposited on the surface of a supporting material 8 is shown in FIGS. 2(A) and 2(B). The material 5, which may comprise magnetic media, comprises bits that are defined by local regions of magnetic permeability of one to several microns in size. Magnetic permeability is a measure of how easily a material can be magnetized. Magnetic permeabilities for soft magnetic materials (materials with large values for their permeability) vary from several thousand for permalloy and amorphous Fe alloys to near to $1\times10^5$ for Co-based amorphous alloys and Finemet®, available from Hitachi Metals, Ltd. Corporation, Tokyo, Japan. Finemet® is an ultrafine grained alloy of Fe, Si, B, Cu, and Nb. The bits are written depositing high permeability magnetic material or using a laser pulse to create the various regions of low or high permeability, and the bits are read with the use of the planer reader 15 that scans and determines variations in local permeability of a material 5.

During operation, the material 5 is positioned under the gap 4. The horizontal position of the material 5 can be established by sliding the edge of the supporting material 8 against positioning posts (not shown). This positioning can easily be performed to within 10 to 100 microns. Furthermore, a spring (not shown) can be used to keep positioning posts near the surface of the planer reader 15. If a small space is required between the supporting material 8 and the planer reader 15, then a small amount of air flow through holes (not shown) in the planer reader 15 will prevent direct contact. The air could enter through these holes (not shown) that are either in the substrate 7 on which the planar reader 15 is deposited on or in the supporting material 8.

The embodiments of the invention as illustrated in FIGS. 1(A) through 2(B) facilitate measuring small DC changes in the magnetic flux, $\Phi_m$, passing through the magnetic sensor 3 that result from opening and closing the flux path by passing the material 5, which may comprise highly permeable magnetic material, near the gap 4 of the planer reader 15. Additionally, as illustrated in an alternate embodiment shown in FIGS. 3(A) and 3(B), the planer reader 16 can be made to function in an AC mode by adding a modulating device 10 to modulate the reluctance of the path of the magnetic flux, $\Phi_m$. The planer reader 16 of the second embodiment is similarly configured to the planer reader 15 of the first embodiment shown in FIGS. 1(A) through 2(B), and as such like reference numerals in FIGS. 1(A) through 3(B) correspond to like components in both embodiments.

Figure 3A:
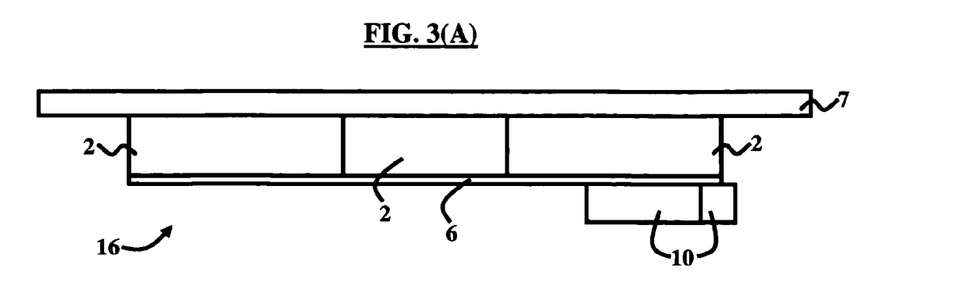
FIG. 3(A) is a side view of a planer reader device according to a second embodiment of the invention.
Figure 3B:
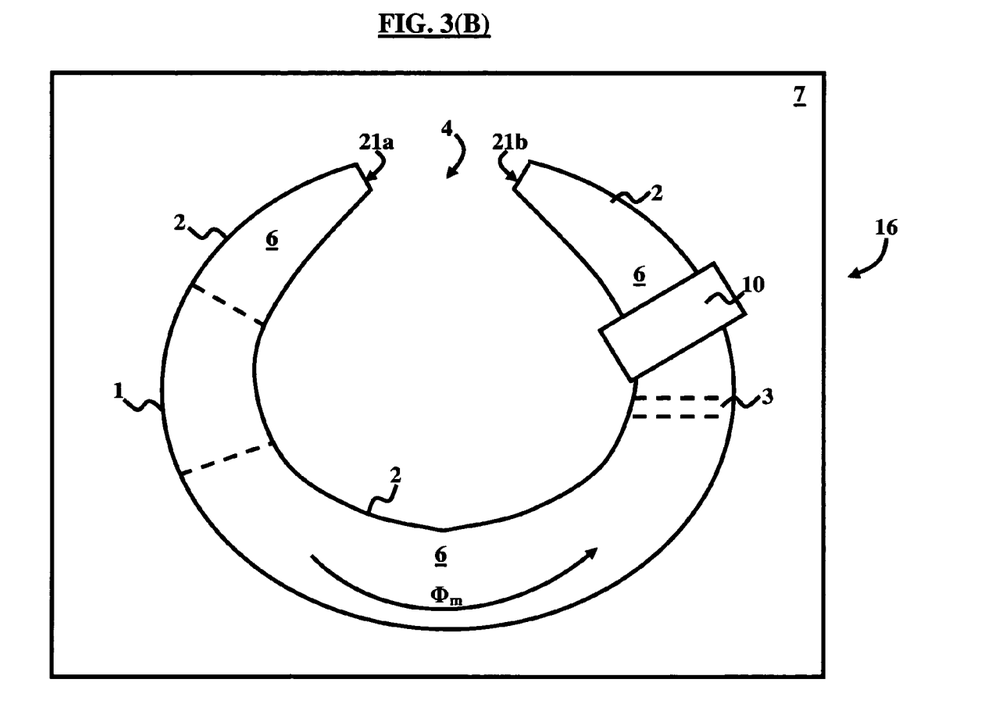
FIG. 3(B) is a top view of the planer reader devices of FIG. 3(A) according to a second embodiment of the invention.

The modulating device 10 can be embodied as a coil which drives the soft magnetic layer 2 into and out of saturation or the modulating device 10 may be embodied as a microelectromechanical system (MEMS) device that opens and closes gaps in the magnetic flux circuit A. The modulating device 10 can either be fabricated on the substrate 7 or on a separate structure (not shown). Furthermore, the modulating device 10 can be a coil connected to a power supply and may be configured to supply a magnetic field as large as 200 Oe. The modulating device 10 can be adjacent to or around the soft magnetic layer 2. The permeability of the soft magnetic layer 2 is very small when its magnetization is saturated. Moreover, modulating the reluctance path will convert the constant magnetic flux going around the magnetic flux circuit A to a magnetic flux whose amplitude is modulated. Thus, the signal detected by the magnetic sensor 3 will be an AC signal. For example, if one modulated the reluctance path by driving the soft magnetic layer 2 into and out of both positive and negative saturation at a frequency, f, then the AC signal will be at a frequency of 2f. The modulation frequency can be 0.1 Hz to 10 MHz. Furthermore, shifting the operation to higher frequencies has the advantages of minimizing the effect of 1/f noise in the magnetic sensor 3 and of minimizing unwanted low and high frequency fields at the position of the magnetic sensor 3.

Figure 4A:
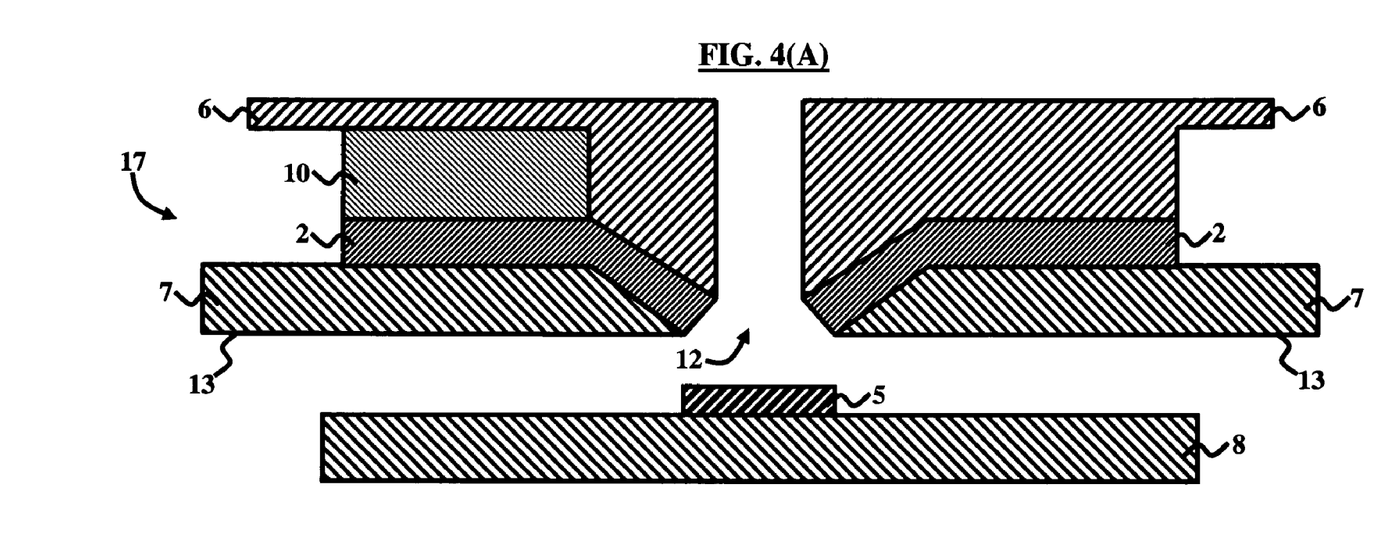
FIG. 4(A) is a cross-sectional view of a planer reader apparatus according to an alternate embodiment of the invention.

The soft magnetic layer 2, which may comprise soft ferromagnetic material, can be deposited by sputtering using standard lithography possibly including electron lithography. If the depositions of the various elements of the planar reader 15, 16 are on the side of the substrate 7 facing the material 5 (first and second embodiments), then the depositions may be made in a recess and then covered with the protective insulator (insulating material) 6. Alternatively, the planar reader 17 can be constructed such that the back side 13 of the substrate 7 faces the material 5. If this is done, one can then bring the path of the magnetic flux, $\Phi_m$, closer to the material 5 by having a tapered hole 12 in the substrate and depositing soft ferromagnetic magnetic material on the surface of the taper as shown in FIG. 4(A).

Figure 4B:
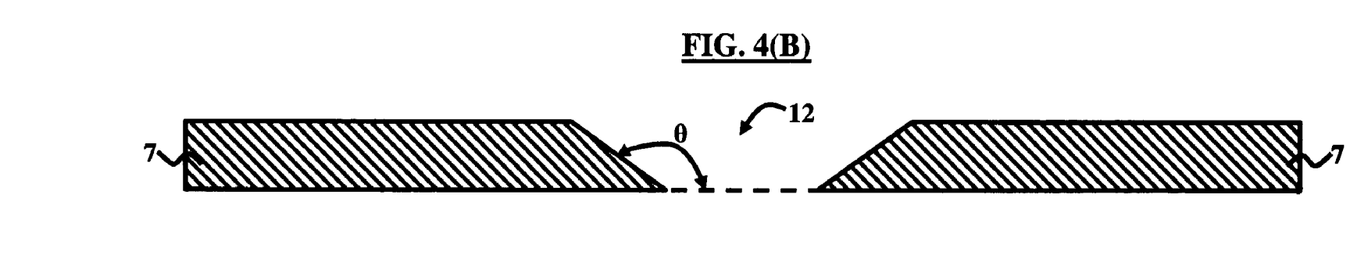
FIG. 4(B) is a cross-sectional view of a geometric configuration of the planer reader apparatus of FIG. 4(A) according to an alternate embodiment of the invention.

As illustrated, the planer reader 17 further comprises a hole 12 configured through the substrate 7, which can be made by anisotropic etching. The geometry of the hole 12 is anisotropic etching is used is shown in FIG. 4(B), wherein θ, in one example, is approximately 147° from the bottom plane of the substrate 7 (indicated as the dashed line in FIG. 4(B)), whereby the 147° angle is formed when the <001> surface of substrate 7 is etched in the embodiment where the substrate 7 comprises silicon. The additional elements illustrated in FIGS. 4(A) and 4(B) refer to elements described in each of the first and second embodiments (FIGS. 1(A) through 3(B)), and as such like reference numerals in FIGS. 1(A) through 4(B) correspond to like components in all embodiments.

Furthermore, as previously mentioned, the planer reader 15, 16, 17 may be fabricated on a substrate 7 that is flexible and which can deform to fit the surface of the supporting material 8 being investigated. As such, this would permit the investigation of ferromagnetic materials with not-flat surfaces. A variety of substrates could be used as flexible substrates including Kevlar® or Mylar®, both available from E. I. du Pont de Nemours and Company, Delware, USA, and thin silicon prepared by dissolving much of the wafer by reactive ion etching (RIE) as described by Mason, A. et al., "A Low-Power Wireless Microinstrumentation System for Environmental Monitoring," Transducers '95/Eurosensors IX, $8^{th}$ Int. Conf. On Solid-State Sensors and Actuators, and Eurosensors IX, Stockholm, Sweden, pp. 107–110 (1995) or a by a boron diffused etch stop as described by Lisby, T. et al., "Fabrication and Characterization of Flexible Silicon Substrates with Electroplated Leads," Proc. of the IEEE Sensors Conference, Orlando, Fla. (2002), the complete disclosures of which, in their entireties, are herein incorporated by reference.

Figure 5A:
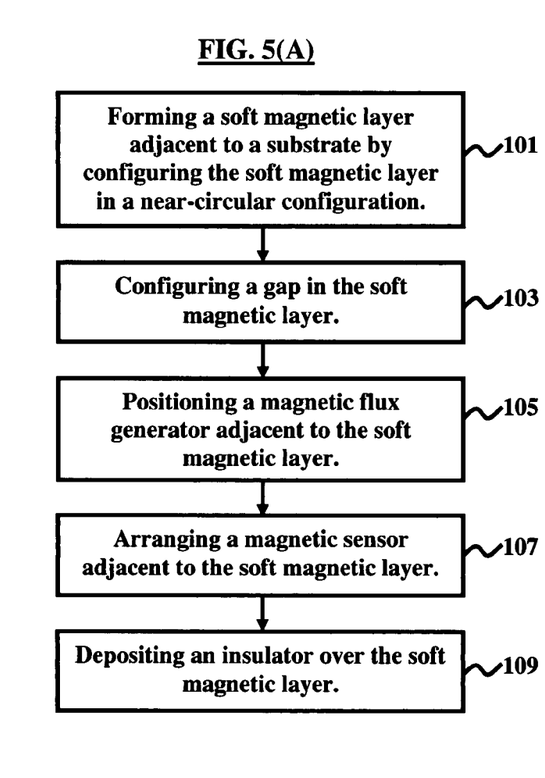
FIG. 5(A) is a flow diagram illustrating a preferred method of manufacturing an embodiment of the invention.

Another embodiment of the invention is illustrated in the flowchart of FIG. 5(A), which includes descriptions which refer to components provided in FIGS. 1(A) through 4(B). FIG. 5(A) illustrates a method of manufacturing a magnetic flux circuit A, wherein the method comprises forming (101) a soft magnetic layer 2 adjacent to a substrate 7 by configuring the soft magnetic layer 2 in a near-circular configuration; configuration (103) a gap 4 in the soft magnetic layer 2, wherein the gap 4 is configured to align with a material 5 located a distance, d, from the soft magnetic layer 2; positioning (105) a magnetic flux generator 1 adjacent to the soft magnetic layer 2, wherein the magnetic flux generator 1 is adapted to provide magnetic flux, $\Phi_m$, to the material 5; arranging (107) a magnetic sensor 3 adjacent to the soft magnetic layer 2; and depositing (109) an insulator 6 over the soft magnetic layer 2, the gap 4, the magnetic flux generator 1, and the magnetic sensor 3. The magnetic sensor 3 is adapted to measure a magnetic permeability of the material 5 by measuring a change in the magnetic flux, $\Phi_m$, when the material 5 is aligned with the gap 4, and wherein the soft magnetic layer 2, the magnetic flux generator 1, and the magnetic sensor 3 are arranged in a co-planer configuration.

The magnetic flux generator 1 may comprise either a magnet or a magnetic coil near or surrounding (i.e., proximate to) the soft magnetic layer 2. In the step of forming (101), the soft magnetic layer 2 comprises permalloy or another soft ferromagnet. Additionally, in the step of configuring (103), the gap 4 creates an opening between a first end 21a and a second end 21b of the soft magnetic layer 2.

Figure 5B:
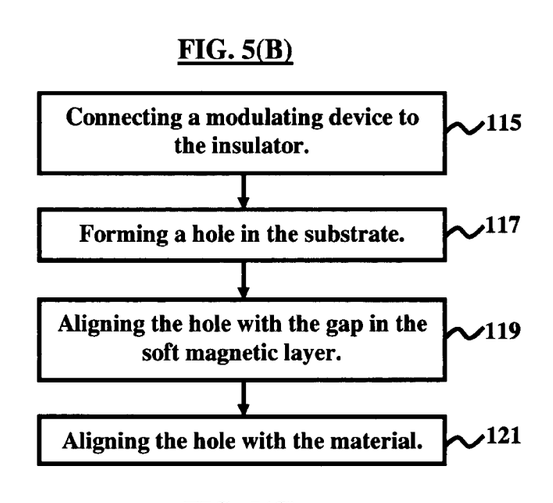
FIG. 5(B) is a flow diagram illustrating a preferred method of another aspect of manufacturing an embodiment of the invention.

As shown in FIG. 5(B), which includes descriptions which refer to components provided in FIGS. 1(A) through 5(A), the method of manufacturing a magnetic flux circuit A further comprises connecting (115) a modulating device 10 to the insulator 6; forming (117) a hole 12 in the substrate 7; aligning (119) the hole 12 with the gap 4 in the soft magnetic layer 2; and aligning (121) the hole 12 while the material 5.

Figure 5C:
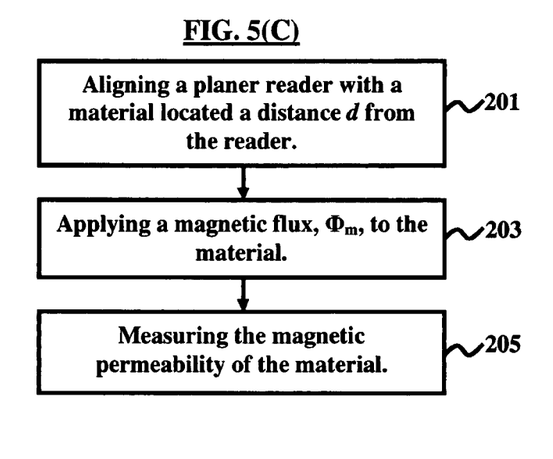
FIG. 5(C) is a flow diagram illustrating a preferred method of operating an embodiment of the invention.

Another aspect of the invention is illustrated in the flowchart of FIG. 5(C), which includes description which refer to components provided in FIGS. 1(A) through 4(B). FIG. 5(C) illustrates a method of probing the magnetic permeability of a material wherein the method comprises aligning (201) a planer reader 15, 16, 17 with a material 5 located a distance, d, from the planer reader 15, 16, 17, wherein the planer reader 15, 16, 17 comprises: a soft magnetic layer 2 configured in a near-circular configuration adjacent to a substrate 7; an insulator 6 covering the soft magnetic layer 2; and a gap 4 configured in the soft magnetic layer 2 and aligned with the material 5. The method further comprises applying (203) a magnetic flux, $\Phi_m$, to the material 5 and measuring (205) the magnetic permeability of the material 5. The step of applying (203) is performed by a magnetic flux generator 1, which may comprises a magnet or a magnetic coil surrounding the soft magnetic layer 2. In the step of aligning (201), the soft magnetic layer 2 comprises permalloy or another soft ferromagnet. Additionally, the gap 4 creates an opening between two ends 21a, 21b of the soft magnetic layer 2. The method further comprises modulating the reluctance of a path of the magnetic flux, $101_m$.

Several applications are suitable for the embodiments of the invention including storing and reading magnetic information in a non-erasable form, which is particularly useful for credit/debit cards and identification tags containing bits of magnetic information in the forms of high and low permeability regions, such as those described in U.S. patent application Ser. No. 10/824,396, filed Apr. 15, 2004, and entitled "Non-Erasable Magnetic Identification Media," the complete disclosure of which, in its entirety, is herein incorporated by reference.

Another application of the planer reader 15, 16, 17 is to characterize rocks and minerals either on Earth or elsewhere in the solar system. This could be accomplished either by bringing the mineral to be investigated to a fixed, known, small distance, d, from the planer reader 15, 16, 17 or by preparing a surface on the minerals to be investigated that is flat enough such that the planer reader 15, 16, 17 can scan the surface. Additionally, the planer reader 15, 16, 17 can also be used for non-destructive testing to investigate defects in surfaces of items during manufacturing or when they are in use. If the surface comprises a magnetic material, then one could scan the surface to see if the local permeability is modified by a defect due to a microcrack, a region of high strain, or a change in chemical composition. If the surface is non-magnetic, one could immerse the material to be tested in liquid comprising nano-sized soft ferromagnetic particles that would become lodged in holes and defects. Additionally, the methodology provides by the embodiments of the invention could be used to investigate the size of below surface holes, defects, and cavities. The test would be performed after the materials to be tested are immersed in liquid comprising nano-sized soft ferromagnetic particles by scanning the surface and looking for changes in the magnetic permeability.

Additionally, the fabrication of the embodiments of the invention offer a low cost approach in producing a highly sensitive planer reader 15, 16, 17 for detecting micron size imperfections in the surface of a material 5 such as a ferromagnetic material. The method offers the advantage of a low cost method for quickly detecting changes in the magnetic permeability on a micron size scale.

The foregoing description of the specific embodiments will so fully reveal the general nature of the invention that others can, by applying current knowledge, readily modify and/or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A magnetic flux circuit comprising:
    a substrate;
    a soft magnetic layer adjacent to said substrate;
    a gap configured in said soft magnetic layer, wherein said gap creates an opening between two ends of said soft magnetic layer, and wherein said gap is configured to align with a material located a distance from said soft magnetic layer;
    a magnetic flux generator adapted to provide magnetic flux to said material;
    a magnetic sensor adapted to measure said magnetic flux traversing said material;
    wherein said substrate comprises a hole aligned with said gap in said soft magnetic layer and said hole is configured to align with said material; and
    wherein said hole is defined by a tapered periphery which underlies the two ends of said soft magnetic layer to thereby position said two ends of said soft magnetic layer in close proximity to said material.

2. The circuit of claim 1, further comprising an insulator covering said soft magnetic layer, said gap, said magnetic flux generator, and said magnetic sensor.

3. The circuit of claim 2, further comprising a modulating device attached to said insulator, wherein said modulating device is configured for modulating said magnetic flux.

4. The circuit of claim 1, wherein said magnetic flux generator comprises a magnetic coil proximate to said soft magnetic layer.

5. The circuit of claim 1, wherein said soft magnetic layer comprises a soft ferromagnet.

6. The circuit of claim 1, wherein said substrate is flexible.

7. The circuit of claim 1, wherein said magnetic flux generator comprises a magnet.

8. A planer reader for probing the magnetic permeability of a material located a distance from said planer reader, wherein said planer reader comprises:
  a substrate;
  a soft magnetic layer adjacent to said substrate;
  a gap configured in said soft magnetic layer, wherein said gap is configured to align with a material located a distance from said soft magnetic layer;
  a magnetic flux generator adapted to provide magnetic flux to said material; and
  a magnetic sensor adapted to measure said magnetic flux that traverses said material.
  wherein said soft magnetic layer, said magnetic flux generator, and said magnetic sensor are co-planer;
  wherein said substrate comprises a hole aligned with said gap in said soft magnetic layer and said hole is configured to align with said material; and
    wherein said hole is defined by a tapered periphery which underlies said soft magnetic layer to thereby position a portion of said soft magnetic layer which overlays the tapered periphery in close proximity to said material.

9. The planer reader of claim 8, further comprising an insulator covering said soft magnetic layer, said gap, said magnetic flux generator, and said magnetic sensor.

10. The planer reader of claim 9, further comprising a modulating device connected to said insulator, wherein said modulating device is configured for modulating said magnetic flux.

11. The planer reader of claim 8, wherein said magnetic flux generator comprises a magnet.

12. The planer reader of claim 8, wherein said magnetic flux generator comprises a magnetic coil proximate to said soft magnetic layer.

13. The planer reader of claim 8, wherein said soft magnetic layer comprises a soft ferromagnet.

14. The planer reader of claim 8, wherein said soft magnetic layer comprises an arcuate configuration having a first end and a second end, and wherein said gap creates an opening between the first and second ends of said soft magnetic layer.

15. A method of manufacturing a magnetic flux circuit, said method comprising:
  forming an aperture having opposed tapered sidewall portions in a substrate;
  forming a soft magnetic layer having an arcuate configuration on said substrate;
  configuring a gap in said soft magnetic layer to create an opening between two ends of said soft magnetic layer, wherein said gap is configured to align with a material located a distance from said soft magnetic layer and each of said ends overlays a tapered sidewall portion of said substrate;
  positioning a magnetic flux generator adjacent to said soft magnetic layer;
  arranging a magnetic sensor adjacent to said soft magnetic layer; and
  depositing an insulator over said soft magnetic layer, said gap, said magnetic flux generator, and said magnetic sensor.
  wherein said magnetic flux generator is adapted to provide magnetic flux to said material,
  wherein said magnetic sensor is adapted to measure a magnetic permeability of said material by measuring a change in said magnetic flux when said material is aligned with said gap, and
  wherein said soft magnetic layer, said magnetic flux generator, and said magnetic sensor are arranged in a co-planer configuration.

16. The method of claim 15, wherein in said positioning, said magnetic flux generator comprises a magnet.

17. The method of claim 15, wherein in said positioning, said magnetic flux generator comprises a magnetic coil proximate to said soft magnetic layer.

18. The method of claim 15, wherein in said forming, said soft magnetic layer comprises a soft ferromagnet.

19. The method of claim 15, further comprising connecting a modulating device to said insulator, wherein said modulating device is configured for modulating said magnetic flux.

* * * * *